US011914859B2

(12) United States Patent
Mochrie et al.

(10) Patent No.: US 11,914,859 B2
(45) Date of Patent: Feb. 27, 2024

(54) ADVERTISING-SUBSIDIZED SMARTPHONES AND ADVERTISING, SMARTPHONE, AND MOBILE COMMUNICATIONS SYSTEMS AND METHODS

(71) Applicant: Airo.Life Inc., Guelph (CA)

(72) Inventors: Douglas Mochrie, Guelph (CA); Martin Guthrie, Moffat (CA)

(73) Assignee: OHANA CORP., Guelph (CA)

( * ) Notice: Subject to any disclaimer, the term of this patent is extended or adjusted under 35 U.S.C. 154(b) by 0 days.

(21) Appl. No.: 16/982,525

(22) PCT Filed: Mar. 20, 2019

(86) PCT No.: PCT/CA2019/050344
§ 371 (c)(1),
(2) Date: Sep. 18, 2020

(87) PCT Pub. No.: WO2019/178690
PCT Pub. Date: Sep. 26, 2019

(65) Prior Publication Data
US 2021/0004155 A1  Jan. 7, 2021

Related U.S. Application Data

(60) Provisional application No. 62/645,718, filed on Mar. 20, 2018.

(51) Int. Cl.
*G06F 3/04886* (2022.01)
*H04M 1/72463* (2021.01)
(Continued)

(52) U.S. Cl.
CPC ........ *G06F 3/04886* (2013.01); *G06F 3/0481* (2013.01); *G06Q 30/0267* (2013.01);
(Continued)

(58) Field of Classification Search
CPC ... G06F 3/04886; G06F 3/0481; H04L 12/14; H04M 15/8083; H04M 1/72577;
(Continued)

(56) References Cited

U.S. PATENT DOCUMENTS 6,928,615 B1 * 8/2005 Haitsuka ................ G06Q 30/02
715/738
7,844,491 B1 * 11/2010 Haitsuka ............ G06Q 30/0241
705/14.56

(Continued)

OTHER PUBLICATIONS

Mobile Marketing Association, Mobile Advertising Guidelines (version 5.0, Feb. 2011), available at https://www.mmaglobal.com/files/mobileadvertising.pdf (Year: 2011).*
(Continued)

*Primary Examiner* — Justin R. Blaufeld
(74) *Attorney, Agent, or Firm* — Own Innovation Inc.; James W. Hinton; Kent Howe (57) ABSTRACT

Computer implemented systems and methods for permanently displaying banner advertisements to a smartphone user, wherein the system provides logic and content to display such advertisements using a process which cannot be disabled by the user, and which does not require actions for the user, and which does not run via a standard-type application which the user would download. The banner ads are constantly displayed and the operating system, and other applications are not presented as full screen applications because the system of the present invention reserves screen space for banner ad placement. In one embodiment, a display driver used by the operating system is configured to reserve banner space on the screen and the "home" application and all other applications are given spatial dimensions representative of the normal viewable area in which those applications use to display information to the user with banner space reserved for display of advertising content.

19 Claims, 5 Drawing Sheets

(51) Int. Cl.
*G06F 3/0481* (2022.01)
*G06Q 30/0251* (2023.01)
*H04L 12/14* (2006.01)
*H04M 15/00* (2006.01)
*H04W 4/24* (2018.01)
*G06Q 30/0207* (2023.01)
*G06Q 30/0273* (2023.01)

(52) U.S. Cl.
CPC ........ *H04L 12/14* (2013.01); *H04M 1/72463* (2021.01); *H04M 15/8083* (2013.01); *H04W 4/24* (2013.01); *G06F 2203/04803* (2013.01); *G06Q 30/0207* (2013.01); *G06Q 30/0273* (2013.01); *H04M 2215/0192* (2013.01)

(58) Field of Classification Search
CPC ...... H04M 2215/0192; G06Q 30/0273; G06Q 30/0217; G06Q 30/0267; G06Q 30/0207
See application file for complete search history.

(56) References Cited

U.S. PATENT DOCUMENTS

| | | | | |
|---|---|---|---|---|
| 8,335,993 | B1* | 12/2012 | Tan | G06F 3/04886 715/837 |
| 8,645,856 | B1* | 2/2014 | Burr | G06Q 30/0241 715/774 |
| 8,712,902 | B2 | 4/2014 | Jobs et al. | |
| 8,744,951 | B2 | 6/2014 | Jobs et al. | |
| 8,799,077 | B2 | 8/2014 | Flake et al. | |
| 2002/0024948 | A1* | 2/2002 | Pendse | H04L 67/535 370/252 |
| 2005/0215238 | A1* | 9/2005 | Macaluso | G06Q 30/0267 455/406 |
| 2007/0022010 | A1* | 1/2007 | Blaser | G06Q 30/02 705/14.54 |
| 2008/0057915 | A1* | 3/2008 | Lahtiranta | H04W 4/24 455/414.1 |
| 2010/0223096 | A1* | 9/2010 | Bosan | H04W 4/24 705/26.1 |
| 2010/0289987 | A1* | 11/2010 | Chang | G02F 1/1347 349/143 |
| 2011/0029386 | A1* | 2/2011 | Devries | G06Q 30/02 705/14.64 |
| 2011/0065423 | A1* | 3/2011 | Karaoguz | H04L 12/14 455/566 |
| 2012/0166294 | A1* | 6/2012 | Lieberman | G06Q 30/0276 705/14.72 |
| 2012/0290397 | A1* | 11/2012 | Cortegiano | H04M 3/4878 705/14.64 |
| 2014/0220927 | A1* | 8/2014 | Girard | H04L 12/1475 455/405 |
| 2014/0344055 | A1* | 11/2014 | Sanghavi | G06Q 30/0272 705/14.55 |
| 2016/0142218 | A1* | 5/2016 | Kim | H04L 12/1475 370/259 |
| 2016/0277812 | A1* | 9/2016 | Bokowski | H04N 21/812 |
| 2016/0381319 | A1* | 12/2016 | Nakajima | H04N 5/77 348/231.99 |
| 2017/0054737 | A1* | 2/2017 | Ren | H04M 15/854 |
| 2017/0178193 | A1* | 6/2017 | Jagannath | G06Q 30/04 |
| 2017/0353758 | A1* | 12/2017 | Senew | H04N 21/44008 |
| 2018/0219987 | A1* | 8/2018 | Pantel | H10K 59/40 |
| 2018/0268777 | A1* | 9/2018 | Kim | G09G 5/10 |
| 2018/0373849 | A1* | 12/2018 | Gidley | G06F 21/6245 |

OTHER PUBLICATIONS

Microsoft Press, dynamic-link library, Microsoft Computer Dictionary 182 (2002 5th ed.) (Year: 2002).*
Dynamic-link library, <https://en.wikipedia.org/w/index.php?title=Dynamic-link_library&oldid=775027618> (revision id. 775027618, published Apr. 12, 2017) (Year: 2017).*
Bit map, Authoritative Dictionary of IEEE Standard Terms 104 (7th Ed. Dec. 2000) (Year: 2000).*
Bitmap, Microsoft Computer Dictionary 61 (5th Ed. 2002) (Year: 2002).*
Encyclopedia Britannica bitmap (Britannica, Jan. 2022) <https://www.britannica.com/technology/bitmap> (Year: 2022).*
Rafael Abreu, What is 16:9 Aspect Ratio—Origins of the Widescreen Format (Jul. 4, 2021), <https://www.studiobinder.com/blog/what-is-16-9-aspect-ratio-definition/> (Year: 2021).*
Satyam Maitrai, 16:9 Aspect Ratio: What Is This And Why This Widescreen Is So Popular?, <https://makestoryboard.com/blog/16-9-aspect-ratio> (Year: 2022).*
CIPO as ISA, International Search Report and Written Opinion for PCT/CA2019/050344, dated Jun. 11, 2020.

* cited by examiner

FIG. 1

240 pixels

Increased - Banner Area — 91

2560 pixels

Traditional 16:9 Viewing Area — 92

1440 pixels

ADVERTISING-SUBSIDIZED SMARTPHONES AND ADVERTISING, SMARTPHONE, AND MOBILE COMMUNICATIONS SYSTEMS AND METHODS

TECHNICAL FIELD

The present disclosure relates generally to mobile communications devices and advertising methods and, more particularly, to advertising-subsidized smartphones and advertising, smartphone, and computer implemented mobile communications systems and methods.

BACKGROUND

The advertising-subsidized smartphones and advertising, smartphone, and mobile communications systems and methods according to the present invention provide advertisers with the ability to reach their target audiences, preferably, like no other means of media, technologies, etc.

Smartphones may have been on the market for quite some time now (e.g., more than 12 years). No smartphone, however, may have been provided with advertisement on the OS level ("ad") banners that run across the top of the device screen, along the side of the device screen, and/or at the bottom of the device screen, for substantially the entire time that the operating system ("OS") functions as when the user is interacting with the device (the display is on/active, otherwise not in a standby state). Rather, generally in the prior art, smartphone users saw ads only in a browser window, on a social media platform, and/or in another application ("app"). The intent of this invention is to constantly display ad banners when the display is on/active, regardless of the currently running application in the background or foreground.

There exists a significantly untapped potential to generate digital advertising revenues, notwithstanding that the digital ad revenue in 2017 may have been over 200 billion USD and the mobile ad revenue in 2017 may been a 141.2 billion USD market.

On the other hand, smartphone service subscriber plans may have typically resulted in monthly costs associated with operation of smartphones. Data/usage plans in some territories and regions (e.g., in Canada and elsewhere) may have been regarded as costly by subscribers there. According to the inventions described herein, however, the consumer may pay nothing. Instead, according to the inventions described herein, digital advertisers may cover the cost of the phone. The advertising-subsidized smartphone and advertising, smartphone, and mobile communications systems and methods according to the invention preferably provide an improved way to target potential buyers of consumer products and services.

SUMMARY OF PARTICULAR EMBODIMENTS

It will be appreciated by those skilled in the art that other variations of the embodiments described below may also be practiced without departing from the scope of the invention. Further note, these embodiments, and other embodiments of the present invention will become more fully apparent from a review of the description and claims which follow.

It is an object of the present invention to obviate or mitigate one or more disadvantages and/or shortcomings associated with the prior art, to meet or provide for one or more needs and/or advantages, and/or to achieve one or more objects of the invention—one or more of which may preferably be readily appreciable by and/or suggested to those skilled in the art in view of the teachings and/or disclosures hereof.

According to the present invention, there is disclosed an advertising-subsidized smartphone and/or advertising, smartphone, and/or computer implemented mobile communications system and/or method.

According to one aspect of the invention, the advertising-subsidized smartphone and/or advertising, smartphone, and/or computer implemented mobile communications system and/or method may preferably provide advertisers with the ability to reach their target audiences, preferably, like no other means of media, technologies, etc.

According to one aspect of the invention, the advertising-subsidized smartphone and/or advertising, smartphone, and/or computer implemented mobile communications system and/or method may preferably provide ad banners that run across the top of the device screen, along the side of the device screen, and/or at the bottom of the device screen, for substantially the entire time that the display is on/active.

Many prior art smartphones may have an inadequate screen size to properly and most readily accommodate banner advertising artwork. According to one aspect of the invention, there is provided a system for enabling advertising-subsidized smartphones—including advertising, smartphone, and mobile communications systems and methods adapted for use—with large screen sizes.

According to another aspect of the invention, there is provided a computer implemented system for enabling advertising-subsidized smartphones—including advertising, smartphone, and mobile communications systems and methods adapted for use—with conventional smartphone screen sizes (e.g., to keep costs down) and/or with a slightly reduced size for the conventional OS display area to accommodate banner ads at the top or bottom and/or a vertical banner at the side of the smartphone screen.

According to one aspect of the invention, there is provided a computer implemented system for enabling advertising-subsidized smartphones—including advertising, smartphone, and mobile communications systems and methods adapted which preferably implement banner ads in, around, and/or in association with the smartphone's OS and/or geolocation system (e.g., a global positioning system or GPS). Preferably, such implementation may target potential customers in small geographical areas of stores and/or companies which digitally advertise with the advertising-subsidized smartphones and advertising, smartphone, and mobile communications systems and methods according to the invention.

BRIEF DESCRIPTION OF THE DRAWINGS

In the drawings, preferred embodiments of the invention are illustrated by way of example. It is to be expressly understood that the drawings are only for the purpose of illustration and as an aid to understanding and are not intended as a definition of the limits of the invention. The embodiments herein will be understood from the following description with reference to the drawings, in which.

DETAILED DESCRIPTION OF EXAMPLE EMBODIMENTS

In this respect, before explaining at least one embodiment of the invention in detail, it is to be understood that the invention is not limited in its application to the details of construction and the arrangements of the components outlined in the following description or illustrated in the drawings. The invention is capable of other embodiments and of being practiced and carried out in various ways. Also, it is to be understood that the phraseology and terminology employed herein are for the purpose of description and should not be regarded as limiting. In particular, all terms used herein are used in accordance with their ordinary meanings unless the context or definition clearly indicates otherwise. Also, unless indicated otherwise except within the claims the use of "or" includes "and" and vice-versa. Non-limiting terms are not to be construed as limiting unless expressly stated or the context clearly indicates otherwise (for example, "including", "having", "characterized by" and "comprising" typically indicate "including without limitation"). Singular forms included in the claims such as "a", "an" and "the" include the plural reference unless expressly stated or the context clearly indicates otherwise. Further, the stated features and/or configurations or embodiments thereof the suggested intent may be applied as seen fit to certain operating conditions or environments by one experienced in the field of art. Although not required, aspects of the present invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including but not limited to wireless devices, Internet appliances, handheld devices, wearable computers, all manner of cellular or mobile phones, multi-processor systems, microprocessor-based or programmable consumer electronics, set-top boxes, network PCs, mini-computers, mainframe computers, and the like. In this regard, the terms "computer," "server," and the like are intended to be used interchangeably, and may refer to any of both devices and systems.

In the case of an embodiment of the computer implemented systems and methods of the present invention for use on a smartphone (or other similar computing device), in order to display a banner ad (or other advertising displays which are not characterized as "banner" ads) to the user at all times, the application providing logic and content to display the ad cannot usually be a "standard" application, as these types of applications can be disabled by the user, and/or require actions from the user in order to execute them, and/or are not always in the foreground of the display. In one aspect, the intent of this invention is to constantly provide banner ads in all modes of operation of the smartphone, including running other applications that would normally be "full screen". In this aspect of the present invention, other apps would not be truly "full screen" because a portion of the display would always be reserved for banner ad placement, whether that be at the top, bottom, or side(s) of the display.

Figure 1:
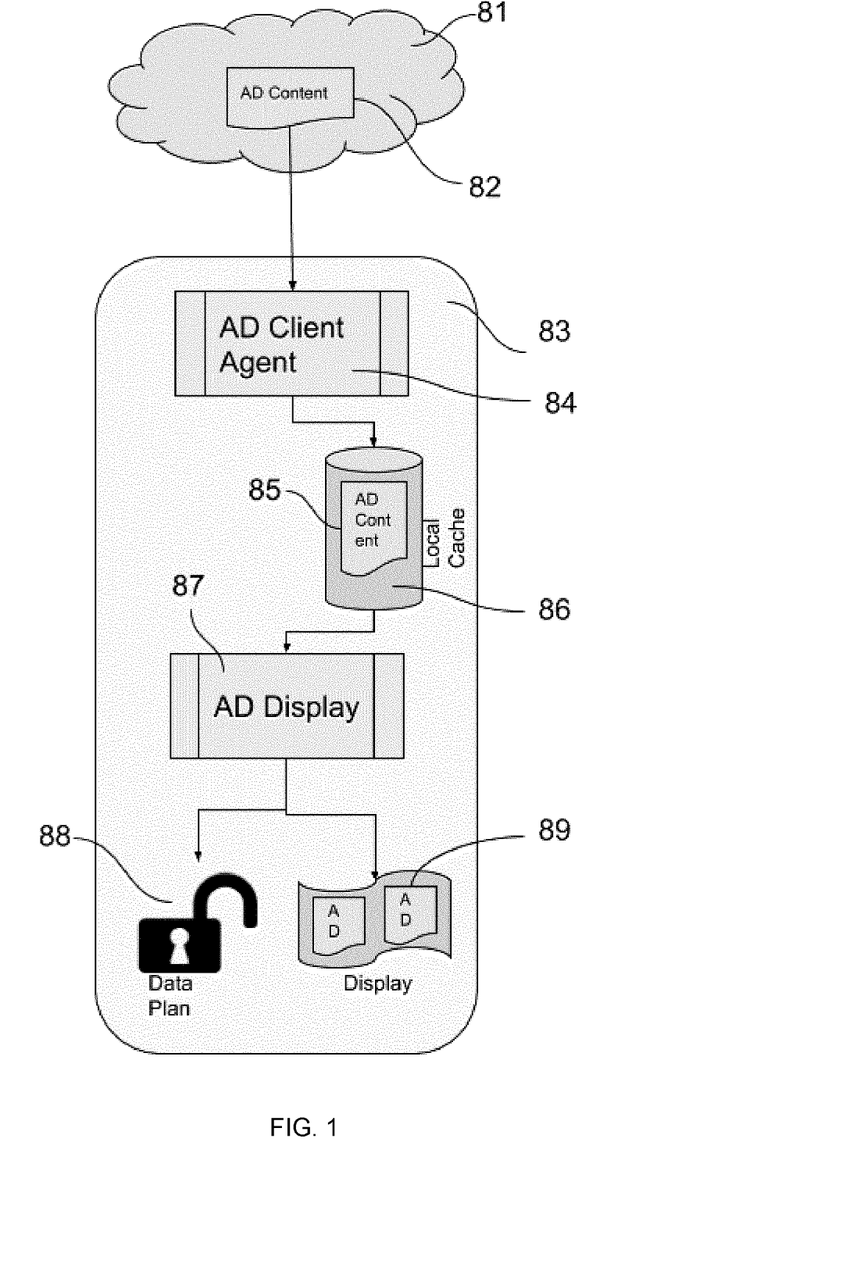
FIG. 1 is a system diagram depicting an example system for enabling the flow of advertising content from the cloud to a phone client app to a banner display and unlock phone data plan in accordance with one aspect of the present invention.

Referring to the drawings, FIG. 1 depicts a high level flow advertising (or ad) content in accordance with one embodiment of the present invention. Here, advertising content 82 is pushed from a backend server 81 represented as being in the cloud. The content may be pushed or pulled using industry standard mobile protocols available. The content is cached in the mobile smartphone internal storage 86 by most ad frameworks that may be employed. Another process of the application 87 would then display the ad content 89 (in a banner or other suggested format) and unlock the phone's 83 data/talk connection 88. Before a phone is purchased, some initial content 85 can be loaded onto the phone so that when a user initially provisions the phone its carrier connection can be unlocked. The process of locking and unlocking the phone services is done thru OS API calls, specific to the OS, and known to those familiar in the art. For example, Android application would require "System Firmware Key" signing to gain access to some of these APIs.

Figure 2:
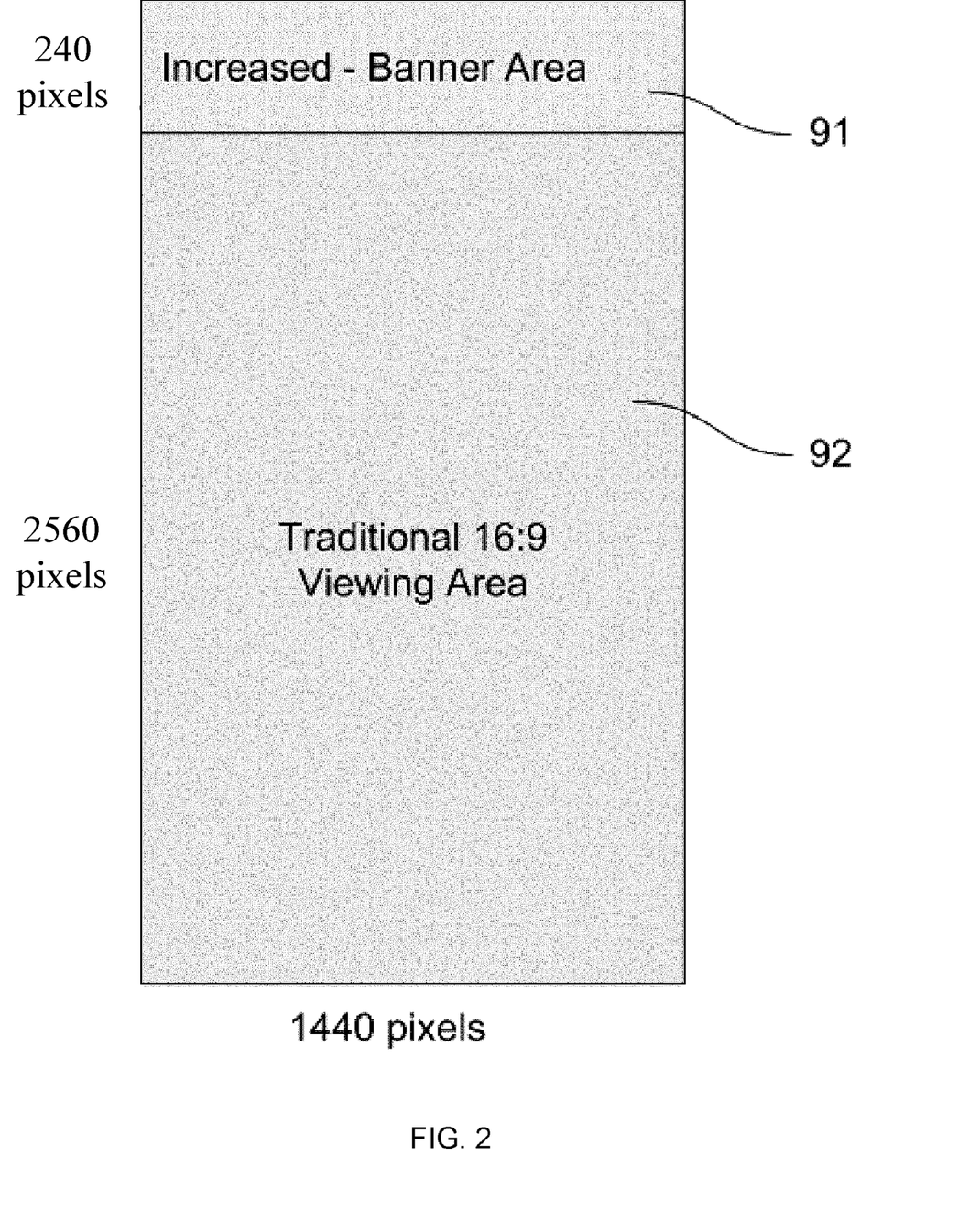
FIG. 2 depicts an example smartphone screen showing increased display size for the banner display area and 16:9 phone high definition viewing area in accordance with one aspect of the present invention.

Referring next to FIG. 2, according to one aspect of the present invention, the advertising-subsidized smartphone and/or advertising, smartphone, and/or mobile communications system and/or method may preferably provide large screen sizes. Typical displays have an aspect ratio of 16:9 in order to display original high definition content in the same scale. For example, today's smartphones use display pixels (X:Y) as one of 1280:720, 1920:1080, 2560:1440, 3840:2160. An embodiment of the present invention is to increase one or both dimensions for the purpose of adding a banner area while still providing a 16:9 viewing area for high definition content. FIG. 2 shows an example of a display that has been increased 240 pixels in the long dimension to provide a banner area 91 at the top (or, flipping the display upside down, the bottom), while still providing a 16:9 area for high definition content 92. Because the viewing area ratio is kept at 16:9 this saves rescaling of high definition content to fit a non-16:9 viewing area, which benefits a given graphics processor to use less memory and/or have higher frames per second.

Figure 3:
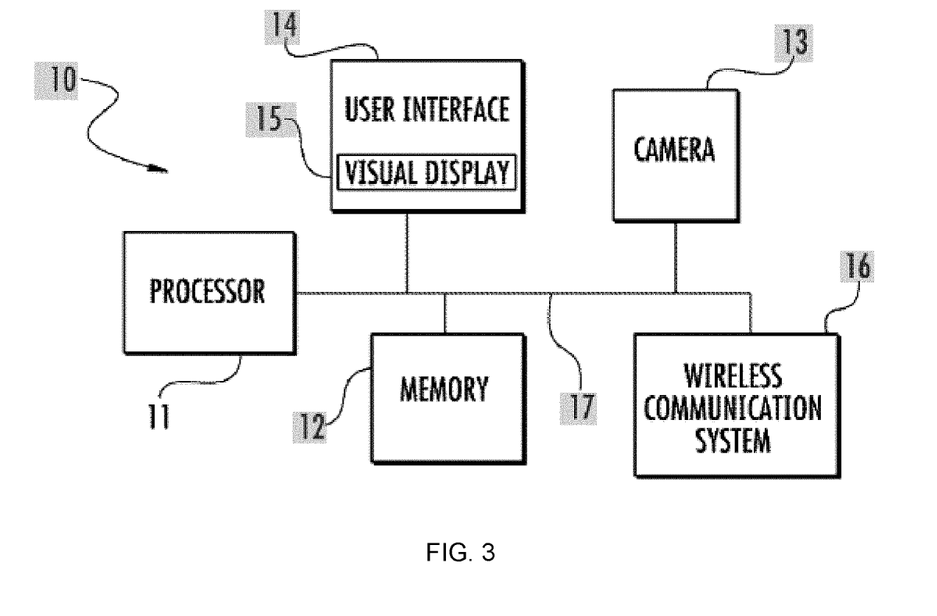
FIG. 3 is a block diagram showing a high level smartphone hardware configuration in accordance with one aspect of the present invention.

FIG. 3 schematically depicts an exemplary mobile device 10 in accordance with the present invention. The mobile device 10 typically includes a processor 11, memory 12, a camera 13, a user interface 14, a display 15, and a wireless communication system 16. The processor 11 is communicatively coupled to the memory 12, the camera 13, the user interface 14, and the wireless communication system 16. The display 15 and the user interface 14 may form a touchscreen.

Exemplary mobile devices may include a system bus 17 and/or one or more interface circuits (not shown) for coupling the processor 11 and other components to the system bus 17. In this regard, the processor 11 may be communicatively coupled to each of the other components via the system bus 17 and/or the interface circuits. Similarly, the other components (e.g., the memory 12, the camera 13, the user interface 14, and the wireless communication system 16) may each be communicatively coupled to other components via the system bus 17 and/or the interface circuits. Other embodiments of system bus architecture providing for efficient data transfer and/or communication between the components of the device may be also be employed in exemplary embodiments in accordance with the present invention.

Figure 4:
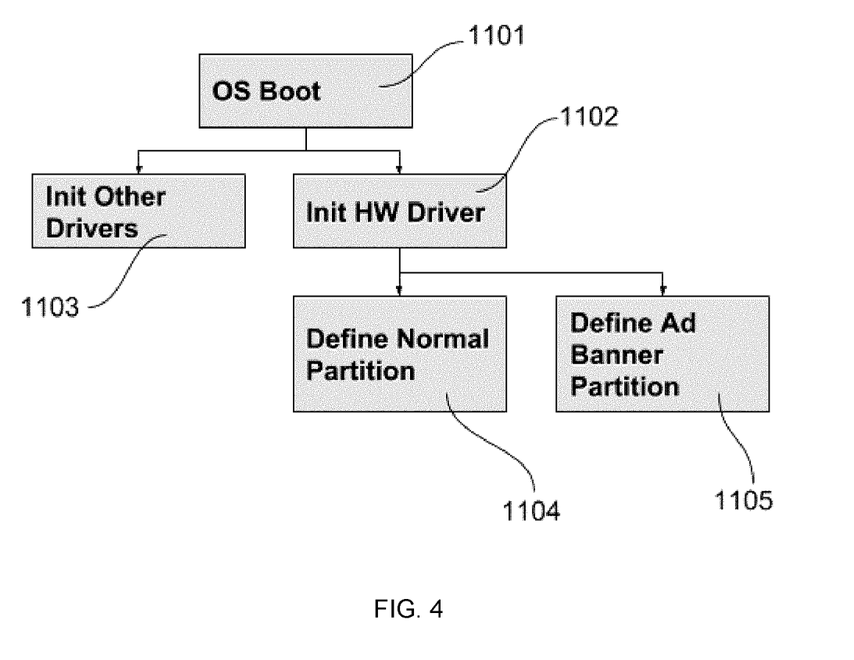
FIG. 4 is a block diagram showing the process for initializing the display driver in accordance with one aspect of the present invention.

According to one aspect of the present invention, as illustrated in FIG. 4, the display driver 1102 used by the operating system will be configured in such a way as to reserve a banner space either at the top, bottom or side of the display viewable area. The "Home" application, and all other applications will be given spatial pixel dimensions that represent the normal viewable area 1104 in which those applications use to display information to the user. The banner space will be reserved for the invention application to use to display Ad content.

According to one aspect of the invention, the advertising-subsidized smartphone and/or advertising, smartphone, and/or computer implemented mobile communications system and/or method may preferably provide smartphone service subscriber plans associated with operation of smartphones and/or data/usage plans whereunder the consumer pays nothing, and/or digital advertisers may cover the cost thereof.

According to one aspect of the invention, the advertising-subsidized smartphone and/or advertising, smartphone, and/or computer implemented mobile communications system and/or method may preferably provide conventional smartphone screen sizes and/or a slightly reduced size for the conventional OS display area to accommodate banner ads at the top or bottom and/or a vertical banner at the side of the smartphone screen.

According to one aspect of the invention, the advertising-subsidized smartphone and/or advertising, smartphone, and/or computer implemented mobile communications system and/or method may preferably provide implement banner ads in association with the smartphone's OS and/or geolocation system and/or target potential customers in small geographical areas of stores and/or companies which digitally advertise according to the invention.

According to one aspect of the invention, the advertising-subsidized smartphone and/or advertising, smartphone, and/or computer implemented mobile communications system and/or method may preferably cover the cost of the smartphone and/or the cost of the smartphone's data and usage plans (e.g., minimum plan of about 5 GB per month, with all national text and calling inclusive), provided the user thereof agrees, up front, for their location and usage data (e.g., data browsing) to be tracked and/or for ads to be presented to them from the smartphone.

According to one aspect of the present invention, the digital ads preferably pay for the smartphone and carrier plan.

According to an aspect of the present invention, advertisements and/or banner advertisements are preferably displayed alongside the smartphone home screen, or currently running selected application. The smartphone preferably allows, according to the invention, for control of the advertisements shown to the users on the smartphone. Upon smartphone set-up, the user preferably gives pertinent information for ad targeting purposes—e.g., address, age, sex, interests, etc. The ads are preferably displayed on the smartphone screen vertically, horizontally, and/or in full screen.

According to an aspect of the invention, the ads can preferably be provided and/or presented using a variety of different electronic file formats (e.g., jpeg, gif, mp4, mov, etc.) and/or preferably work with the smartphone's geolocation system and/or search history (e.g., browser search history) for ad targeting and/or ad remarketing.

According to an aspect of the present invention, an app-based banner advertisement app is provided that preferably can be deployed on a wide variety of different smartphones makes and models. Preferably, this app integrates into the smartphone's OS in such a way that it recognizes when the user has disabled advertisements via the app and/or does not allow function of the smartphone unless the app is active. Preferably, the integration and operation of this app with the smartphone OS may provide much the same operation and functionality as the advertising-subsidized smartphone, and other advertising, smartphone, and mobile communications systems and methods, according to the invention.

Figure 5:
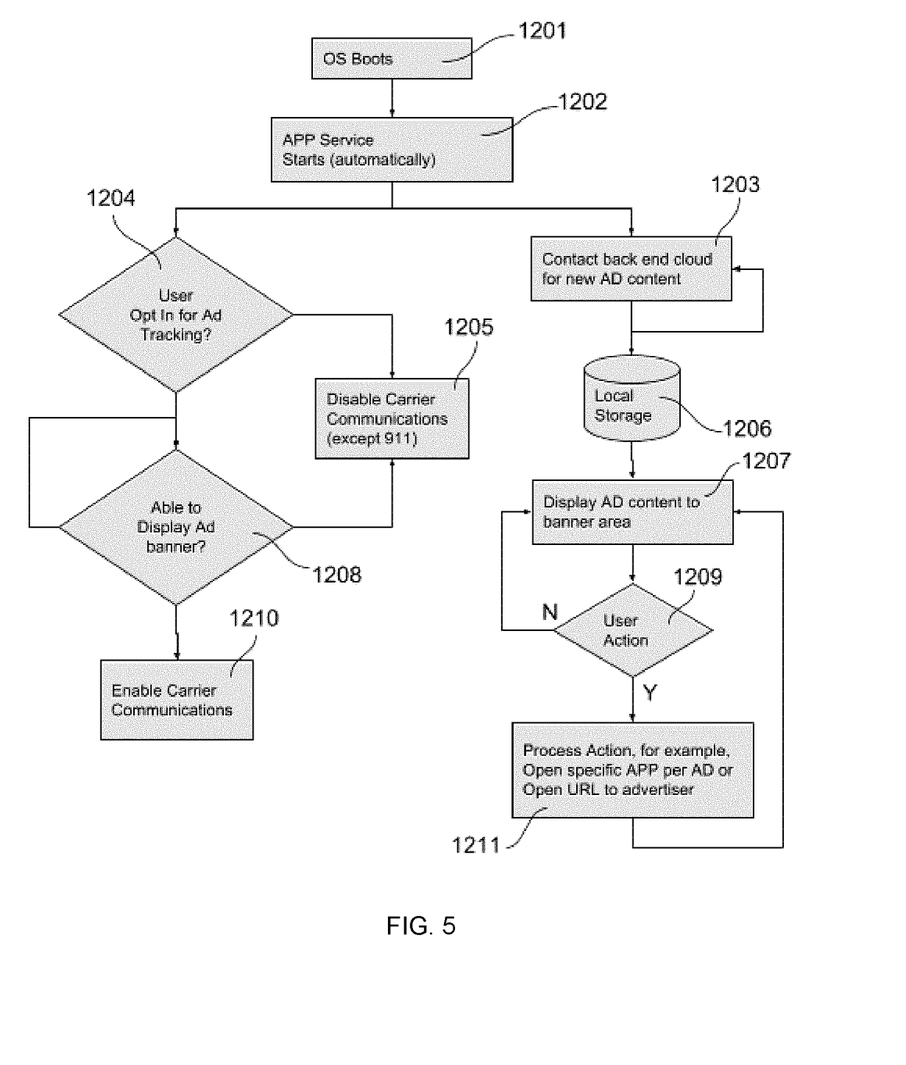
FIG. 5 is a flow diagram showing application process in accordance with one aspect of the present invention.

As shown in FIG. 5, the processor is configured to run an application 1202 after the OS boots 1201 and configures the display driver as described in FIG. 4. The application determines if the user has opted in to advertising 1204 and further determines 1208 that it is able to display dds, and if it can, enables carrier mobile communications 1210, or if not, disables them 1205. The app also connects with the cloud 1203 and receives, and/or synchronizes, ad content to its local storage 1206. The application will also be retrieving ad content from local storage 1206 and displaying that content 1207, and monitoring for user actions 1209. User actions are processed 1211 depending on how the ad content was configured to respond to user actions. For example, the user action could result in another app being opened, or a URL and browser to be opened, or the ad repeated, if it was a moving animation.

Preferably, according to one aspect of the invention, the ads may be displayed at the top of the screen, the bottom of the screen, vertically at the sides of the screen and, sometimes, covering the whole screen. The ads can preferably change—sometimes displaying on the top of the smartphone screen, then disappearing and reappearing on the bottom of the smartphone screen. One intended use of the banner ads or videos ads according to the invention may preferably, but need not necessarily, be to increase click-throughs for products and services that the intended user might require.

According to an aspect of the present invention, rotation of ads can be selected by the advertiser—e.g., 5 second banner ad, 10 second banner ad, 20 second banner ad, etc. Additionally or instead, the advertiser may preferably select a specific scale and/or time for their ads, and/or a duration of the ad campaign—e.g., 1 day, 2 day, ongoing, etc.

Persons skilled in the art will appreciate in view of the teachings and disclosures herein that the advertising-subsidized smartphone and advertising, smartphone, and mobile communications systems and methods according to the invention offer significant advantageous utilities and/or functionality in comparison to the prior art. Among other things, the advertising-subsidized smartphone and advertising, smartphone, and mobile communications systems and methods according to the invention preferably offer a first in the way advertisements (in the form of banners ads, videos, jpeg, gif, mp4, mov, etc.) are displayed directly on the smartphone screen around the operating system, geo-targeted based on smartphone GPS and browser history.

The device, system, and/or method may preferably, but need not necessarily, afford users and consumers with increased access to smartphone services while eliminating associated costs for them. The present invention preferably provides users and consumers with a free phone by displaying ads on the top, bottom, or sides of the smartphone's screen—sometimes with full screen coverage behind the unlock screen. According to the invention, advertisers preferably pay for the smartphone and a smartphone data plan by paying for their advertisements (e.g., banner ads) to be served to smartphone users and potential consumers. According to the invention, smartphone users agree up front—e.g., when signing off in their initial agreement online and/or when signing up for advertising-subsidized smartphone and advertising, smartphone, and mobile communications systems and methods according to the invention—to have their information collected as they otherwise receive the smartphone for free.

The invention is principally contemplated for use in association with smartphones and advertisements visually presented from the display screens thereof to afford increased advantageous utilities in association with same. The invention, however, is not so limited. Other embodiments, which fall within the scope of the invention, may be provided. Various modification to the banner ads may provided with 2D images and/or video banners, gifs, etc. being deployed. While aspects of the present invention, such as certain functions, are described as being performed exclusively on a single device, the invention can also be practiced in distributed environments where functions or modules are shared among disparate processing devices. The disparate processing devices are linked through a communications network, such as a Local Area Network, Wide Area Network, or the Internet. In a distributed computing environment, program modules may be located in both local and remote memory storage devices. Further, aspects of the invention may be stored or distributed on tangible computer-readable media, including magnetically or optically readable computer discs, hard-wired or pre-programmed chips, nano-technology memory, biological memory, or other data storage media. Alternatively, computer-implemented instructions, data structures, screen displays, and other data related to the invention may be distributed over the Internet or over other networks.

Naturally, in view of the teachings and disclosures herein, persons having ordinary skill in the art may appreciate that alternate designs and/or embodiments of the invention may be possible (e.g., with substitution of one or more components for others, with alternate configurations of components, etc.). Although some of the components, relations, configurations and/or steps according to the invention are not specifically referenced in association with one another, they may be used, and/or adapted for use, in association therewith. All of the aforementioned and various other structures, configurations, relationships, utilities, any which may be depicted and/or based hereon, and the like may be, but are not necessarily, incorporated into and/or achieved by the invention. Any one or more of the aforementioned structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any modification, combination or permutation of any of the components, elements, functions, operations, or steps described or illustrated anywhere herein that a person having ordinary skill in the art would comprehend. All such modifications, combinations and permutations are believed to be within the sphere and scope of the invention as defined by the claims appended hereto.

We claim:

1. A non-transitory computer-readable storage medium having stored thereon computer-executable instructions that, when executed by a processor of a mobile device, cause the mobile device to:
    execute an operating system of the mobile device, wherein the operating system comprises an application integrated therewith, wherein the application partitions a display of the mobile device having an aspect ratio of 35:18 into:
        a content space corresponding to spatial pixel dimensions on the display, for displaying a home screen of the operating system and user applications running on the mobile device; and
        an advertisement space corresponding to spatial pixel dimensions on the display, for displaying advertisements independently of the home screen and the user applications running on the mobile device and independent of user interaction with the home screen and the user applications,
        wherein the advertisement space and the content space have no overlap;
    determine whether advertisements are displayed in the advertisement space to:
        connect the mobile device to a wireless network upon displaying the advertisements in the advertisement space;
        permit wireless voice calling, text messaging and data communications of the mobile device only while the advertisements are displayed; and
        disable the wireless voice calling, text messaging and data communications of the mobile device when the advertisements are not displayed.

2. The non-transitory computer-readable storage medium of claim 1, wherein the content space has an aspect ratio of at least 16:9.

3. The non-transitory computer-readable storage medium of claim 1, wherein the position of the content space relative to the position of the advertisement space is variable.

4. The non-transitory computer-readable storage medium of claim 1, further comprising instructions that cause the mobile device to:
    receive user consent, via a user interface of the mobile device, to continuously display advertisements in the advertisement space.

5. The non-transitory computer-readable storage medium of claim 1, further comprising instructions that cause the mobile device to:
    retrieve the advertisements from a local storage of the mobile device for display in the advertisement space.

6. The non-transitory computer-readable storage medium of claim 1, further comprising instructions that cause the mobile device to:
    download the advertisements from a server connected to the mobile device for display in the advertisement space.

7. A mobile device, comprising:
    a display having an aspect ratio of 35:18 for presenting content and advertisements, wherein the display is partitioned into at least a first portion and a second portion by an application integrated into an operating system of the mobile device, the first portion and the second portion having no overlap; and a user interface for receiving user input,
wherein the mobile device is configured to:
  determine whether advertisements are displayed on the first portion of the display to:
    connect the mobile device to a wireless network upon displaying the advertisements on the first portion of the display;
    permit wireless voice calling, text messaging and data communications of the mobile device only while the advertisements are displayed;
    disable the wireless voice calling, text messaging and data communications of the mobile device when the advertisements are not displayed; and
  display content on the second portion of the display, wherein the advertisements are displayed independently of the content and independent of user interaction with the content.

8. The mobile device of claim 7, further configured to:
receive user consent, via the user interface, to continuously display advertisements on the first portion of the display.

9. The mobile device of claim 7, wherein the second portion of the display has an aspect ratio of at least 16:9.

10. The mobile device of claim 7, wherein the first portion of the display has an aspect ratio of 1:6 that covers the entire width of the display.

11. The mobile device of claim 7, wherein the content comprises:
a home screen of an operating system installed on the mobile device; and
applications running on the mobile device.

12. The mobile device of claim 7, wherein the advertisements comprise:
images, videos, GIFs, text or any combination thereof.

13. The mobile device of claim 7, wherein the position of the first portion of the display relative to the position of the second portion of the display is variable.

14. The mobile device of claim 7, wherein the display and the user interface form a touchscreen.

15. The mobile device of claim 7, further configured to:
retrieve the advertisements from a local storage of the mobile device for display in the first portion of the display.

16. The mobile device of claim 7, further configured to:
download the advertisements from a server connected to the mobile device for display in the first portion of the display.

17. A method for concurrent display of advertisements independent of content displayed on a mobile device, the method comprising:
partitioning, by a display driver configured by an application integrated into an operating system of the mobile device, a display of the mobile device having an aspect ratio of 35:18, into at least a first portion and a second portion, the first portion and the second portion having no overlap;
generating the content, by the operating system or the application, for display on the second portion of the display;
retrieving the advertisements for display on the first portion of the display;
determining whether the advertisements are displayed on the first portion of the display;
connecting the mobile device to a wireless network upon displaying the advertisements on the first portion of the display;
permitting wireless voice calling, text messaging and data communications of the mobile device only while the advertisements are displayed; and
disabling the wireless voice calling, text messaging and data communications of the mobile device when the advertisements are not displayed.

18. The method of claim 17, further comprising:
receiving user consent, via a user interface of the mobile device, to continuously display the advertisements on the first portion of the display; and
displaying the advertisements on the first portion of the display concurrent to displaying the content on the second portion of the display, wherein the advertisements are displayed independently of the content and independent of user interaction with the content.

19. The method of claim 17, wherein retrieving the advertisements comprises:
retrieving the advertisements from a local storage of the mobile device; and
downloading the advertisements from a server connected to the mobile device.

* * * * *